United States Patent Office 3,561,975
Patented Feb. 9, 1971

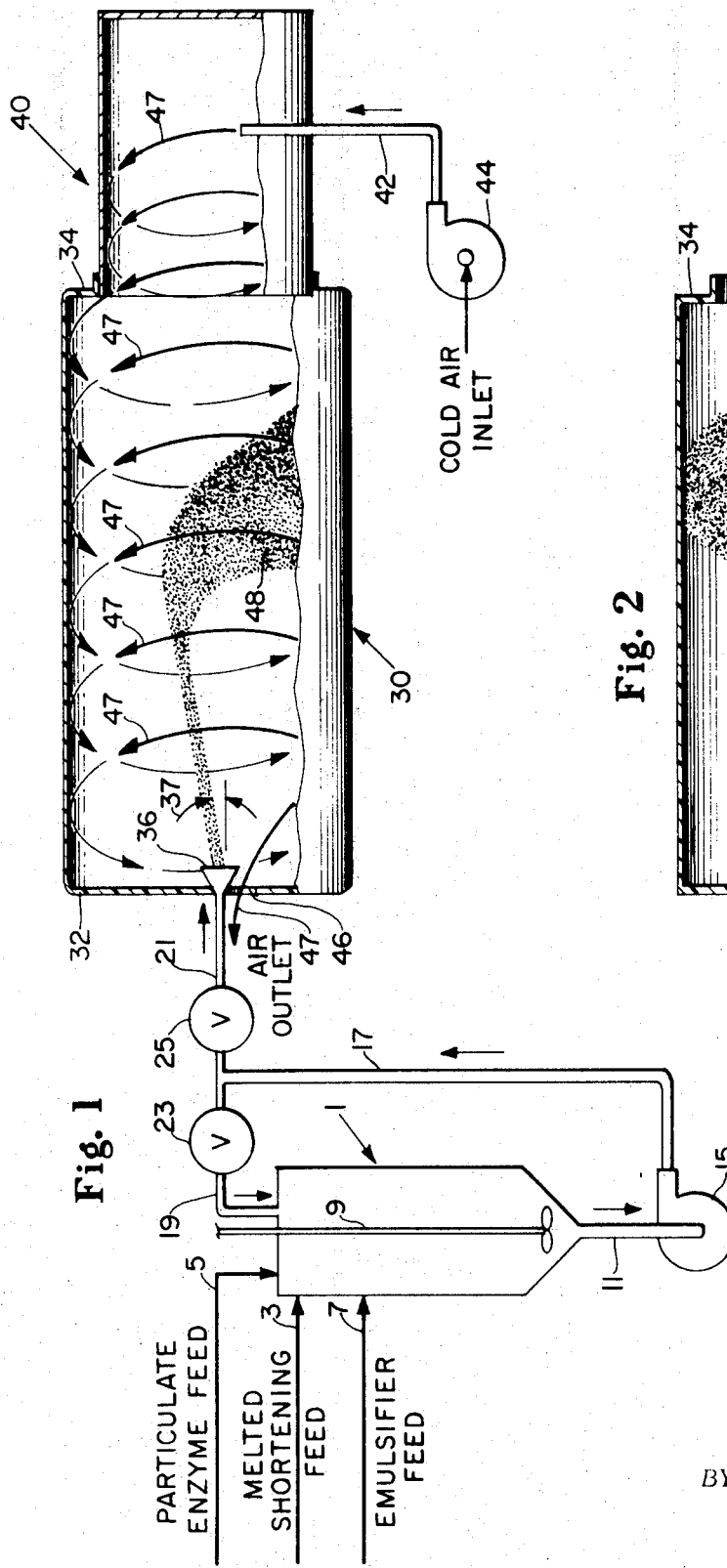

3,561,975
ENZYME ADDITIVE FOR PIE DOUGH AND
MIX UTILIZING SAME
James E. Luebering, Cincinnati, and Eddy R. Hair, Colerain Township, Hamilton County, Ohio, assignors to The Procter & Gamble Company, Cincinnati, Ohio, a corporation of Ohio
Filed May 10, 1968, Ser. No. 728,242
Int. Cl. A21d 8/04
U.S. Cl. 99—94
8 Claims

ABSTRACT OF THE DISCLOSURE

Shortening-coated protase, e.g., papain, is employed as an ingredient in pie dough. As a result of this, the amount of crust shrinkage occurring during baking is reduced, while before baking, good dough handling properties are maintained. A preferred method for coating enzyme is by spray cooling, i.e., by prilling, a suspension of enzyme particles in melted shortening.

BACKGROUND OF THE INVENTION

Pie crust doughs are ordinarily prepared in a two-step process. In the first of these steps, shortening, flour, and optional dry ingredients such as salt are blended until a substantially uniform mixture is achieved. This mixture is denoted a dry mix even though it can contain up to about 10% by weight moisture which is present principally in the flour ingredient. In the second of these steps, water is added to the dry mix, and this combination of ingredients is mixed until the water is absorbed by the flour.

During this second step, proteins in the flour in the dry mix are hydrated. The mixing action in the second step causes hydrated protein strands to become ordered. The hydrated protein arranged in such fashion forms a tough, rubbery, elastic structure which is the essential framework of dough on which other constituents, e.g., shortening, are supported. The hydrated protein is denoted gluten, and the protein framework is denoted a gluten network. The mixing action is known as gluten development. When mixing action causes the dough to be characterized by maximum strength and elasticity, the gluten network is said to be fully developed. Dough with a "strongly developed" gluten network has substantial strength and elasticity.

During baking, water is evaporated from the dough, and the gluten coagulates. This coagulation is an irreversible denaturization characterized by decreased solubility and extensibility of the protein strands. After coagulation is completed the baked dough is referred to as crust. The gluten begins to coagulate at a temperature on the order of 165° F. to 200° F.

A relatively strong or highly developed gluten network is preferred in unbaked dough so that it has sufficient strength to resist tearing during rolling out, placing in a pie pan and shaping. Dough with a weak gluten network has a tendency to tear during such handling.

On the other hand, the stronger the gluten network is during baking, the more the crust shrinkage is. This is because a strong gluten structure induces contraction in the gluten framework during baking when water in the dough is evaporating and the gluten is coagulating, resulting in high crust shrinkage. A weaker gluten network allows less contraction during baking and provides a lesser amount of crust shrinkage.

Pie crust shrinkage is a problem, especially with cream pies where the pie shell is cooked before filling addition, since the pie shell often shrinks below the level of the top of the pie pn whereby not as much filling is able to be used as compared to where there is reduced shrinkage. Moreover, due to crust shrinkage, the filling can overtop the crust, leaking out when individual slices of pie are cut and served, and detracting from the general appearance of the served portion.

Thus, in dough processing, the extent of gluten development is ordinarily a compromise, providing a strong enough gluten network to resist tearing during handling while attempting not to accept an excessive amount of shrinkage in the baked crust.

Methods of weakening a gluten network in unbaked dough to reduce crust shrinkage may be known in the prior art. For example, at page 227 of Sultan, W. J., Practical Baking, The Avi Publishing Company, Inc., Westport, Conn., 1965, it is stated that during a dough conditioning period prior to baking, the gluten of the dough is mellowed by action of enzymes present in the flour, and that the conditioning period helps eliminate shrinkage. Moreover, Bryce, W. W., "Manufacturing Uses of Enyzmes," Food Manuf. 41, #1, 18–20 (January 1966), discloses the use of bacterial proteinase in pastry to prevent shrinkage "in cases." However, neither of these references teaches an agent such as that of the present invention which not only reduces shrinkage occurring as a result of baking but also negates dough handling problems which normally accompany enzyme-caused gluten weakening especially when the dough is not rolled immediately, i.e., within 5 minutes, after it is prepared. This negation of dough handling problems even after a delay before roll-out is important because immediately roll-out often is not practically accomplished.

SUMMARY OF THE INVENTION

It has been discovered that by employing shortening-coated proteolytic enzyme as an ingredient in pie dough preparation, the above described benefits of reduction of pie crust shrinkage occurring during baking while maintaining good dough handling properties before baking, are achieved.

The type and amount of coating on the enzyme shields the dough gluten network before dough baking from excessive weakening as a result of the enzyme. Thus, even with the coated enzyme present, the gluten network can be strongly developed during the step of combining dry mix with the water ingredient, to provide a dough which has good dough handling properties. In other words, the present invention permits the production of dough which does not have the tendency to tear during rolling out, placing in a pan, and shaping, that is characteristic of dough prepared employing an uncoated enzyme crust shrinkage-reducing agent and not immediately rolled out.

Furthermore, the type and amount of coating and enzyme in the instant discovery are such that during baking the shortening enrobing the enzyme in the shrinkage-reducing agent is melted to expose active enzyme to the uncoagulated gluten network to partially destroy that network, whereby shrinkage in the baked crust is reduced at least about 25 percent and even up to 50 to 75 percent.

Thus, the instant invention relates to a shortening-coated proteolytic enzyme pie crust shrinkage-reducing agent and to a dry mix containing this agent. It further relates to a preferred method for producing this agent by spray cooling, i.e., by prilling, a dispersion of particulate enzyme in melted shortening.

BRIEF DESCRIPTION OF THE DRAWING

FIG. 1 is a flow chart outlining a preferred spray cooling process mentioned above.

FIG. 2 is a plan view depicting the V-spray angle of the spray pattern inside chamber 30 and above nozzle 36 in the cooling process of FIG. 1.

DETAILED DESCRIPTION OF THE INVENTION

The pie crust shrinkage-reducing agent herein consists of substantially spherical particles each comprising a particular shortening having embedded regularly therein particular proteolytic enzyme particles.

Preferably the spherical particles comprise, in addition to the required shortening and enzyme, as an optional ingredient a particular emulsifier uniformly distributed throughout the shortening. When the shortening melts during dough baking, this emulsifier disperses readily in the water phase of the dough carrying with it enzyme whereby the enzyme contacts the gluten network more readily than when the emulsifier is not present. This efficient distribution of enzyme because of the emulsifier can result in increased crust shrinkage reduction.

The spherical particles have diameters ranging from 150 microns to about 1.5 millimeters, preferably ranging from about 200 to about 500 microns. The enzyme particles each have a longest dimension ranging from about 5 to about 150 microns, preferably ranging from about 10 to about 50 microns; they ordinarily pass through a screen having a mesh ranging from about 150 to about 600. The enzyme particles having a longest dimension ranging from about 100 to about 150 microns ordinarily should be employed only in the spherical particles having diameters ranging from about 500 microns to about 1.5 millimeters. In other words, an enzyme particle longest dimension can exceed about 100 microns only when the diameter of the spherical particle in which it is present exceeds about 500 microns. The size of the smallest dimension of the enzyme particles has little, if any, effect on their performance. As many as 10 or more enzyme particles can be present in one spherical particle, with 4 to 8 enzyme particles usually being present in each spherical particle.

If spherical particles having diameters smaller than about 150 microns are employed with enzyme particles having a longest dimension greater than about 100 microns or if spherical particles having diameters smaller than about 500 microns are employed with enzyme particles having a longest dimension greater than about 150 microns, there is a substantial risk of an excessive amount of enzyme being at the spherical particle surface uncovered or lightly covered by shortening whereby the gluten network is weakened in the unbaked dough resulting in tearing of the dough during handling. On the other hand, if the spherical particle diameter size exceeds the above upper limit of about 1.5 millimeters, a sufficient amount of enzyme may not be exposed early enough during dough baking to weaken the gluten network to significantly reduce crust shrinkage.

The weight ratio of shortening to enzyme in the spherical particles ranges from about 20:1 to about 1:1, with a range of about 10:1 to about 5:1 being preferred and about 8:1 being optimum. When an emulsifier is used, the weight ratio of shortening to emulsifier ranges from about 20:1 to about 5:1, with a range of about 10:1 to about 6:1 being preferred and about 8:1 being optimum. If the spherical particles have a shortening to enzyme weight ratio of less than about 1:1 and/or the weight ratio of shortening to emulsifier is less than about 5:1, there is a substantial risk of tearing during dough handling. If the spherical particles have a shortening to enzyme weight ratio of more than about 20:1, crust shrinkage often is not significantly reduced. The use of spherical particles with a weight ratio of shortening to emulsifier of more than about 20:1 does not always provide a significant benefit over particles with emulsifier being entirely absent.

The proteolytic enzymes used herein must be stable and not substantially deactivate at the temperatures to which they are exposed in the oven before their shortening coating is melted. Thus, the enzymes herein should not substantially deactivate at temperatures below about 95° F., with those enzymes having a deactivation temperature exceeding about 150° F. being preferred. Moreover, the enzyme utilized herein preferably should be effective at a low enough level so as not to adversely contribute to crust flavor.

Proteolytic enzymes suitable for use herein include, for example, bromelin, ficin, pancreatin, pepsin, rennin, and fungal and bacterial proteinases. Fungal proteinases include, for example, the commercial products, "Rhozyme A-4," "Rhozyme 41," and "Fermex MT," each of which is derived from the fungus Aspergillus oryzae. A bacterial proteinase can be produced starting with a culture of a particular strain of B. subtilis as described in chapter 10 of Reed, G., and Underkoffer, L. A., Enzymes in Food Processing, Academic Press, New York, 1966. Other suitable proteolytic enzymes are listed at pages 182-188 of Kirk-Othmer Encyclopedia of Chemical Technology, 2nd edition, volume 8, John Wiley & Sons, New York, 1965.

A proteolytic enzyme preferred for use herein is papain. It substantially deactivates at about 200° F. and thus is considerably more stable at oven temperatures than most, if not all, other proteolytic enzymes. Moreover, it is readily commercially available at relatively low cost and is approved for use in food products. Furthermore, it is effective at very low levels as described hereinafter.

Various of the above proteolytic enzymes are readily available as free flowing powders with proper particle size for use in the present invention. If necessary, the enzyme particles can be comminuted before use herein.

The shortening suitable as a coating for the enzyme is plastic or solid at room temperature and, in general, has a complete melting point rainging from about 95° F. to about 155° F.

The use of a shortening with a complete melting point above the above-specified general lower limit of about 95° F. enables the shortening to melt at a temperature consistent with product stability during storage. In other words, the shortening does not melt during product storage due to ambient conditions whereby the product would be rendered unfit for use.

The use of a shortening with a complete melting point below the above-specified general upper limit of about 155° F. enables the shortening to melt at a temperature below the gluten coagulation temperature of 165° F. to 200° F. so that in the oven the enzyme in the dough is exposed to and can weaken the gluten network before the gluten coagulates and before the crust irreversibly shrinks.

Moreover, the shortening which is utilized must have a complete melting point within the above general range which is below the deactivation temperature of the enzyme employed so that active enzyme is exposed to the gluten network when the coating shortening melts during baking.

With papain as the proteolytic enzyme, a coating shortening with a complete melting point ranging from about 115° F. to about 140° F. has been found to be especially suitable, with a melting point of about 125° F. considered to be optimum. With these melting points, the enrobing shortening melts to release the papain readily for maximum exposure to the gluten network at a temperature well below that enzyme's deactivation temperature.

Moreover, the coating shortening in addition to possessing the above required melting characteristics preferably has a Solids Content Index (SCI) value at 70° F. ranging from about 30 to about 100, an SCI value at 105° F. ranging from about 15 to about 60, and an Iodine Value (I.V.) ranging from about 20 to about 85. SCI values are measured herein by the dilatometric method of Fulton, Lutton and Wille, JAOCS, 31, 98 (1954).

A shortening composition is easily formulated from hardstock and/or basestocks by those skilled in the shortening art when the shortening's melting point, SCI values at 70° F. and at 105° F. and Iodine Value are specified.

The shortenings useful herein are either hardstock or are formulated by combining hardstock with as much as 90 to 95 percent by weight of the shortening of basestock.

Hardstock suitable for use in formulating these shortenings are normally solid substantially fully saturated fatty triglycerides. These triglycerides include substantially completely hydrogenated cottonseed oil, soybean oil, rapeseed oil, palm oil and tallow.

Basestocks suitable for use in formulating these shortenings are any liquid glyceride vehicles having an SCI value at 70° F. ranging from about 0 to about 10 and an Iodine Value ranging from about 110 to about 95. Liquid triglyceride oils suitable for use as basestocks include, for example, those derived from soybean oil, cottonseed oil, corn oil, safflower oil, wallflower seed oil, sunflower seed oil, and peanut oil.

Particular shortenings useful as coatings herein include, for example, a mixture of 50 percent by weight cottonseed oil hydrogenated to an I.V. of 8 (hardstock) and 50 percent soybean oil hydrogenated to an I.V. of 107 and winterized (basestock). This shortening has a complete melting point of 125° F., an SCI value at 70° F. of 50, and SCI value at 105° F. of 30, and an I.V. of 50. Another shortening which can be employed herein consists, for example, entirely of cottonseed hardstock, and, in particular, of cottonseed oil hydrogenated to an I.V. of 8. This shortening has a complete melting point of 135° F.

The optional emulsifier component of the spherical particles is a sorbitan fatty glyceride polyoxyethylene derivative. These emulsifiers ordinarily contain from about 5 to about 40 oxyethylene groups per molecule. The fatty glyceride portion can be, for example, monolaurate, monooleate, monostearate, tristearate, or trioleate. Suitable emulsifiers are the commercial products manufactured under the "Tween" trade name. For example, a preferred emulsifier is "Tween 21" which is polyoxyethylene sorbitan monolaurate containing 20 oxyethylene groups per molecule. Other suitable commercial products include, for example, "Tween 80" which is polyoxyethylene sorbitan monooleate containing 20 polyoxyethylene groups per molecule, "Tween 85" which is polyoxyethylene sorbitan trioleate containing 20 oxyethylene groups per molecule, "Tween 60" which is polyoxyethylene sorbitan monostearate containing 20 oxyethylene groups per molecule, "Tween 65" which is polyoxyethylene sorbitan tristearate containing 20 oxyethylene groups per molecule, and mixtures of these.

Turning now to methods of producing the sperical particles of crust shrinkage-reducing agent herein, the particles of this agent can be conveniently produced by various conventional methods for coating particulate solids with plastic or solid coating material. Suitable coating techniques include, for example, fluidized-bed coating wherein the particulate enzyme to be coated is suspended in a fluidized bed wherein it is contacted with melted shortening, and pan coating wherein melted shortening is sprayed onto the particulate enzyme while the enzyme is agitated in a spherical coating pan.

A preferred method for producing the spherical particles herein is by spray cooling, i.e., by prilling, a dispersion of enzyme in melted shortening. In this prilling process the melt dispersion is forced through a nozzle whereby it is formed into drops, and then these drops are allowed to solidify while being cooled, for example, by a cooling gas such as cold air.

With continuing reference to the figures herein, in this prilling process the shortening is melted, for example, in a jacketed stainless steel tank (not shown), by heating at a temperature at least at the shortening melting point.

The shortening maintained in melted condition at a temperature less than the enzyme deactivation temperature is then pumped into agitated dispersion tank 1 via pipe 3. Particulate enzyme is fed into tank 1, for example, by a solids feed hopper (not shown) via pipe 5. The emulsifier, if any, is fed into tank 1 via pipe 7. The relative rates of feeds of the components depends upon the ratio of the ingredients desired in the final product, such ratios having been stated hereinbefore.

Tank 1 is a stainless steel maxing tank equipped with an agitator 9. The tank is vertically oriented and its top portion is cylindrical while its bottom portion is shaped like an inverted cone. It can be surrounded with a heating jacket to maintain the temperature of the ingredients inside it so as to prevent solidification of the shortening inside the tank.

In tank 1, the shortening in melted condition is mixed with the particulate enzyme and emulsifier, if any, to uniformly distribute the enzyme and emulsifier through the sohrtening to form a dispersion of particulate enzyme in melted shortening. The emulsifier is dissolved in the shortening. The mixing action is furnished by agitator 9. The agitation is preferably moderate in degree and is normally carried out for a period of time ranging from about 15 seconds to about 5 minutes, preferably for a time period ranging from about 30 seconds to about 1 minute. In this period of time, the agitation causes a dispersion to be produced.

The dispersion is pumped out of the bottom of tank 1 via pipe 11 through and by centrifugal pump 15 into pipe 17. Pipe 17 terminates in a T-connection, one leg of the T being a pipe 19 through which the dispersion can be recycled back into tank 1 to impart to the dispersion in the tank aditional mixing stabilizing and fine temperature adjustment, if desired. Through the other leg of the T, pipe 21, dispersion discharges into the spray cooling device described hereinafter. Pipes 19 and 21 contain valves 23 and 25, respectively, to adjust the relative flow rates between the recycle line and the line to the spray cooler and to aid in the adjustment of the pressure on the dispersion entering the spray cooler. The flow rate of the dispersion entering the spray cooler in general is determined by the need to provide a spray pattern as described below and by the cooling capacity of the spray cooler; the greater the cooling capacity is, the greater the dispersion feed rate can be. In general, feed rates into the spray cooler can range from 25 pounds/hour to 1000 pounds/hour at a pressure ranging from 20 p.s.i.g. to 120 p.s.i.g.

The spray cooler herein comprises a horizontally-oriented cylindrical chamber 30 having a feed end 32 and cooling gas inlet end 34. Chamber 30 conveniently has a diameter ranging from about 2 feet to about 10 feet and a length ranging from about 5 feet to about 20 feet. It is suitably fashioned from polyethylene, e.g., a polyethylene bag of the specified dimensions.

Pipe 21 communicates with feed end 32 at approximately the horizontal axis of chamber 30 by means of spray nozzle 36. Spray nozzle 36 is preferably a hollow, non-clogging nozzle with a V-spray angle as defined below. The term 'hollow" is employed herein to denote the absence of cores, vanes, or other obstructions. For example, a VVSS 4003 V-jet nozzle, available from Spraying Systems, Inc., is suitable for use herein. This nozzle is rated to produce a 40 degree V-spray angle with a feed rate of 0.3 gallon per minute water at a pressure of 40 p.s.i.g.

The dispersion is pumped via pipe 21 through spray nozzle 36 into chamber 30. The feed rate, nozzle pressure, and type of nozzle interact to spray the dispersion into the chamber 30 to form droplets of dispersion having diameters ranging from about 150 microns to about 1.5 millimeters. The dispersion is sprayed in a generally sharp, flat, angular pattern. As it leaves the nozzle, the spray pattern is directed by the nozzle at an angle 37 ranging from 0 to about 20 degrees with and above the horizontal, i.e., 0 to about 20 degrees above the horizontal axis of the cylindrical chamber 30. As it leaves the nozzle the spray pattern has a thickness ranging from about 0.02 to 0.15 inch. The vertex of the angular pattern is at the source of the spray, that is, at nozzle 36. The V-spray angle, i.e., angle 38 depicted in FIG. 2, at the vertex of the angular pattern ranges from about 20 to about 40 degrees. The spray pattern follows the trajectory in which it is directed by the nozzle until the speed of each individual droplet (spherical particle) is decreased approximately to zero as a result of resistance in the chamber 30. This decrease in speed to zero ordinarily occurs toward the midpoint of the length of chamber 30. At this point as a result of gravity the spherical particles fall and collect in a pile on the bottom surface of chamber 30. During the course of their trajectory the droplets are solidified as described below. The droplets of sprayed dispersion, both in molten state and solidified, are depicted in FIGS. 1 and 2 as dots 48 within chamber 30.

The cooling gas inlet end 34 of chamber 30 is closed except for a circular opening which communicates with a cylindrical gas feed chamber 40. This chamber can be, for example, a 55 gallon carbon steel drum which is open at its communicating end.

Toward the open end of chamber 40, for example 2.5 feet from the open end of chamber 40, and entering that chamber tangentially is cooling gas inlet line 42.

Cold gas, such as air, is supplied through line 42 by a pump 44. The gas is supplied to chamber 40 at a temperature ranging from about −20° F. to about +40° F., preferably ranging from −10° F. to +10° F. The gas is cooled by any conventional method, for example, by contacting it with refrigeration coils.

Thus, the cooling gas is fed generally countercurrent to the dispersion spray and because of the cylindrical nature of chambers 30 and 40 circulates in spiral fashion therearound. The spiral gas flow direction is represented by arrows 47. The gas inlet is downstream of the spray at a distance from the vertex of the angular pattern measured along the horizontal axis of chamber 30, approximately equal to the length of chamber 30, i.e., ranging from about 5 to about 20 feet. The diameter of the spiral approximates the diameter of chamber 30 and thus ranges from about 2 to about 10 feet. The spent cooling gas leaves chamber 30 through gas outlet 46 in feed end 32 of chamber 30.

The circulating gas cools the droplets of sprayed dispersion to solidify these droplets as spheres, i.e., as spherical particles. The solidified droplets have about the same diameters as the droplets before solidification, i.e., ranging from about 150 microns to about 1.5 millimeters.

The amount of cooling gas sufficient to solidify the spheres of dispersion before they collect in the bottom of chamber 30 depends upon an interrelationship between dispersion spray temperature, spray rate, spray pressure, spray configuration, and cooling gas temperature. In general, the ratio of the cooling gas flow rate to dispersion spray rate ranges from about 0.1 to about 0.5 cubic feet of gas per minute per pound of dispersion per hour.

The spherical particles, i.e., the solidified spherical droplets which collect in chamber 30, can be used or packaged immediately or stored for later use and/or packaging, for example, in chamber 30 itself, especially if chamber 30 is fashioned from a polyethylene bag since the bag can be disconnected from the rest of the spray cooling apparatus and replaced by a similar empty bag for the next run.

Variations of the above described prilling process also can be used to produce spherical particles of shrinkage-reducing agent herein. For example, the spray cooling device can be vertically oriented with the dispersion being sprayed from the bottom and the cooling air entering the top.

If an additional shortening coating is desired for the particles produced in the above described prilling process, more of the same melted shortening can be sprayed onto the product from the prilling process while that product is maintained in continuous agitation in a spherical coating pan.

Turning now to the utility of the above described crust shrinkage-reducing agent, that agent is ordinarily incorporated into a pie crust dry mix.

Such a dry mix ordinarily comprises from about 55 to about 75 percent flour and from about 25 to about 45 percent substantially enzyme-free shortening. The phrase "substantially enzyme-free shortening" is used herein to refer to the shortening in the dry mix which is not in the shrinkage-reducing agent. Soft winter wheat flour and normally plastic shortening are preferred flour and shortening ingredients. To produce the dry mix the flour is simply blended with the shortening.

A dry mix capable of providing a flaky crust is grossly homogeneous. It generally contains from about 25 percent to about 45 percent by weight shortening and ordinarily comprises greased flour (that is, flour which is "wetted" by or has absorbed shortening), substantially shortening-free flour and flour-covered shortening in the form of discrete lumps. It is these discrete lumps of shortening which provide the flaky quality. An especially advantageous dry mix for producing flaky pie crusts comprises by weight from about 10 percent to about 50 percent greased flour, from about 5 percent to about 25 percent shortening in the form of discrete lumps not exceeding about one-half inch in diameter, and substantially shortening-free flour. Optional dry ingredients and moisture are considered part of the flour.

Continuous processes for providing dry mixes that provide especially tender flaky crusts are described in the copending applications of Edward E. Colby and August Kokal, Jr., Ser. No. 448,313, filed Apr. 15, 1965, now U.S. Pat. No. 3,384,494 and of William T. Bedenk and James E. Luebering, Ser. No. 557,979, filed June 16, 1966, now U.S. Pat. No. 3,486,908.

When the shrinkage-reducing agent of the present invention is employed as an ingredient in a dry mix, that dry mix comprises, in addition to flour and shortening ingredients, from about 0.2 percent to about 1.5 percent by weight of the mix of the shrinkage-reducing agent. The use of less than about 0.2 percent agent sometimes results in little or no crust shrinkage reduction. The use of more than about 1.5 percent agent can result in unsatisfactory dough handling properties and/or off-tasting crust.

When a shrinkage-reducing agent containing both emulsifier and a basestock-containing shortening is employed, the dry mix comprises no more than about 0.6 percent by weight of the mix of shrinkage-reducing agent. This is because due to the more efficient enzyme distribution system provided by the emulsifier ingredient in combination with the basestock-containing shortening, dough handling properties can be unsatisfactory if much more than about 0.6 percent of such an emulsifier-containing agent is employed. In general, less agent can be employed in the dry mix to produce the same shrinkage results if the agent contains emulsifier than if not.

In order to insure proper crust-shrinkage reduction, the amount of agent present in a dry mix should be sufficient to provide from about 0.1 to about 1.5 Northrop Units (NU) of enzyme activity per gram of flour in the dry mix, preferably from about 0.6 to about 0.8 NU per gram of flour in the dry mix. A Northrop Unit is a unit of proteolytic enzyme activity. A method for measuring enzyme activity in terms of Northrop Units is described at pages 171–182 of L. A. Underkofler, R. L. Barton and F. L. Aldrich, "Methods of Assay for Microbial Enzymes," Developments in Industrial Microbiology, Vol. 2, 1961.

Preferably the flour in the dry mix contains from about 7 to about 15 percent by weight protein.

The instant shrinkage-reducing agent is homogeneously distributed through the dry mix. It can be incorporated into the dry mix by premixing it with flour in a ribbon mixer previous to mixing the flour with shortening. Or it can be added after shortening flour mixing by gentle blending, for example, in a twin shell blender.

In order to form dough, first water is added to the dry mix containing the instant agent to form a wetted mix. The added water amounts to from 10 percent to about 25 percent by weight of the wetted mix. Sufficient work is then added to the wetted mix, for example, in a modified paddle mixer to form dough characterized by a strongly or fully developed gluten network whereby high dough strength is achieved during dough handling. In general, the dough comprises by weight from about 10 to about 25 percent water, from about 20 to about 35 percent shortening, from about 40 to about 60 percent flour, and from about 0.004 to about 0.2 percent added enzyme.

The dough can be immediately rolled, for example, to one-eighth inch thickness, placed in a pie pan, and trimmed and shaped to fit the pan. "Immediately" in this context denotes within 5 minutes after dough preparation. Due to its strong gluten network developed during the above-described dough formation step, the dough is resistant to tearing during this handling.

Alternatively, the dough can be conditioned at room temperature, i.e., subjected to a rest or storage step, for a period ranging, e.g., from one-half to about 2 hours, ordinarily about one hour, after dough formation and prior to rolling. This conditioning period improves shrinkage reduction in the baked crust as compared to when no such conditioning period is employed. The benefits of this conditioning period can also be achieved by rolling out the dough and fitting it to a pan immediately after dough formation and then subjecting the rolled shaped dough to such a conditioning period. Where the shortening coating in the reduced crust-shrinkage agent is entirely hardstock or hardstock and emulsifier or contains no emulsifier, such a conditioning period often is preferred to allow some enzyme to diffuse through the coating before baking in order to significantly reduce crust shrinkage as compared to where no crust-shrinkage reducing agent is employed.

The pie crust shell formed by rolling the dough and shaping it to the pan is then baked, for example, in an electric oven at 450° F. for 11 to 12 minutes, and a golden yellow baked crust results. During and as a result of the first part of this baking step, the shortening enrobing the enzyme in the shrinkage-reducing agent is melted at a temperature below both the gluten coagulation and enzyme deactivation temperatures. Active enzyme is then exposed to the gluten network to partially destroy that network. When either of the gluten coagulation or enzyme deactivation temperatures are reached inside the dough mass, gluten network destruction by the enzyme ceases. In a 450° F. oven with papain as the enzyme in the shrinkage-reducing agent, gluten coagulation and enzyme deactivation temperatures are reached about 2 minutes after baking has started; thus, in this 2-minute period, shortening melts exposing the papain to partially destroy the gluten network. As a result of the use of the agent of the instant invention, shrinkage in the baked crust is reduced at least about 25 percent, usually 50 to 75 percent, compared to where no shrinkage-reducing agent is employed as an ingredient in the dough.

Turning now to methods for testing benefits derived from the shrinkage-reducing agents herein, dough handling properties are characterized by dough sheet strength measurements. The dough sheet strength is measured by placing 5 grams of dough in a 0.5 inch diameter cylinder having a 0.125 inch diameter orifice in its end, and measuring the amount of force in grams required to extrude the dough through the orifice. The higher the sheet strength is, the less likely the dough is apt to tear during handling. A dough sheet strength of 1050 grams or below denotes unacceptable handling properties in that the dough usually tears during rolling out, placing in a pan, and shaping. A dough having a sheet strength ranging from 1050 to 100 grams often tears during handling. A dough having a sheet strength ranging from 1100 to 1250, sometimes tears during handling, while doughs having sheet strengths greater than about 1250 almost never tear during handling.

The crust-shrinkage reduction property of the agents herein is measured by comparing the amount of crust amount of crust shrinkage in control dough made the same as the agent-containing dough except that it contains an additional amount of flour which replaces and has a weight equal to the shrinkage-reducing agent. In the crust shrinkage testing procedure, dough is rolled out and shaped to a pie pan. This pan is 8 inches in diameter at the bottom, 9 inches in diameter at the top. The side portion of the pan is 1.5 inches in length and the lip extending from the top of this side is 0.4 inch in length. The dough is fitted to the very end of the lip of the pan. After baking, the length of lip and side portion of the pan not covered by crust is measured in tenths of inches at eight equidistant points on the circumference of the pan. The average of these eight measurements is the amount of shrinkage. The percent shrinkage reduction is calculated by dividing the difference between the amount of shrinkage in control dough and the amount of shrinkage in the agent-containing dough, by the amount of shrinkage in the control dough, and multiplying by 100.

The following specific examples are illustrative of the present invention. In these examples, dough sheet strength and percent shrinkage reduction are measured as described above. Percentages of ingredients are by weight unless otherwise indicated.

Example I

A six-pound batch of shrinkage-reducing agent is made.

The shrinkage-reducing agent is in the form of substantially spherical particles having diameters ranging from about 200 to about 500 microns.

The particles contain shortening and enzyme. The batch contains 89.3 percent by weight shortening and 10.7 percent by weight enzyme. Thus, the weight ratio of shortening to enzyme in the batch is 8.3:1. The composition of each spherical particle is similar to the composition of the batch. In each spherical particle, shortening enrobes particles of enzyme which are regularly embedded therein.

The shortening is cottonseed hardstock, i.e., cottonseed oil hydrogenated to an Iodine Value of 8. It has a complete melting point of 135° F.

The enzyme is papain. It is present in the form of particles each having its longest dimension ranging from 10 to 50 microns. Its particle size is further characterized in that it can be sifted through a 350 mesh screen.

The batch of shrinkage-reducing agent is prepared with the processing apparatus depicted in FIG. 1. With reference to FIG. 1, in the apparatus used herein, the chamber 30 is constituted of polyethylene and is 4.5 feet in diameter and 8.5 feet long. The chamber 40 is a 55-gallon carbon steel drum. The air inlet 42 enters chamber 40 tangentially at a distance of 11 feet from the feed end 32 of the chamber 30. The nozzle 36 is a VVSS 4003 V-jet nozzle described hereinbefore.

In this preparation, 5.35 pounds of the above-described shortening is melted by heating it in a jacketed stainless steel tank at 160° F. The melted shortening is then pumped into dispersion tank 1 and thereafter cooled to 138° F. by the addition of Dry Ice. Then 0.65 pound of particulate papain is added to tank 1. The shortening and papain are then moderately agited in tank 1 for 45 seconds to form a dispersion.

The dispersion is pumped from the dispersion tank into the spray nozzle at the rate of 100 pounds per hour. No dispersion is recycled back into tank 1. The dispersion is sprayed through the nozzle at a pressure of 40 p.s.i.g. with a V-spray angle of 25 degrees. The spray pattern is directed at an angle of 10 degrees with and above the horizontal. The spray pattern thickness is approximately 0.06 inch. The spraying action of the nozzle forms the dispersion into spherical droplets having diameters ranging from 200 to 500 microns.

The droplets are solidified in the form of spherical particles by cooling air which enters the apparatus through pipe 42. The cooling air enters the apparatus at a temperature of 0° F. and at a rate of 3 cubic feet per minute. The ratio of air flow rate to dispersion spray rate is 0.03 cubic feet per minute per pound per hour. The spherical particles contain on the average 89.3% shortening and 10.7% enzyme.

A pie crust dry mix is then prepared as follows: 140 grams of soft winter wheat flour containing 11 percent protein, and 3.6 grams of salt are premixed with 2.0 grams of the above-prepared shrinkage-reducing agent by mixing for 3 minutes in a paddle mixer at 150 r.p.m. This mixture is then combined with 92.4 grams of plastic shortening ("Crisco") by mixing for 3 minutes in a paddle mixer at 150 r.p.m.

The resulting dry mix contains by weight 58.82 percent flour, 38.82 percent substantially enzyme-free shortening, 1.52 percent salt, and 0.84 percent shrinkage-reducing agent. The substially enzyme-free shortening is present as discrete lumps having diameters not exceeding one-half inch and also as a consituent in greased flour. The papain is 0.09 percent by weight of the mix and is present in the mix in an amount providing 0.7 Northrop Unit of activity per gram of flour.

At this point, the 238 grams of the dry mix at 75° F. are weighed into a standard dough mixing bowl having a capacity of 0.5 quart. To the dry mix is then added 42 grams of water so that the wetted mix contains 15 percent by weight water. The wetted mix is then mixed for 0.5 minute with a paddle mixer with a mixer head speed set at 150 r.p.m. to form dough.

The dough is then subjected to a one-hour conditioning period, i.e., a one-hour rest period at room temperature.

From this batch of conditioned dough, 200 grams are separated to be formed into crust. The rest of the dough is saved for sheet strength testing.

The 200-gram batch of dough is rolled to one-eighth inch thickness, placed in a pie pan of the type described previously, trimmed, and shaped to fit the pan. No tearing occurs during this handling. The dough has a sheet strength of 1550 grams.

The dough is then baked for 11 minutes in a 450° F. oven. In another case, crust is baked from control dough prepared and conditioned and handled as above except that the control dough does not contain a shrinkage-reducing agent but contains instead an equal weight of additional flour. Shrinkage in crust made from the agent-containing dough is reduced approximately 25% compared to the crust made from the control dough.

In still another case, dough is prepared and conditioned as above except that uncoated enzyme is employed as a shrinkage-reducing agent and flour replaces the weight of the coating. This dough is estimated to have sheet strength of 800, and tears during handling.

In the examples in the following table, dough and baked crust are prepared according to the same procedures and from the same ingredients and amounts thereof as in Example I except where otherwise is indicated. In those examples where emulsifier is employed, the requisite amount is added into dispersion tank 1 immediately after the shortening has been pumped into that tank.

TABLE

| | Example | | | | |
|---|---|---|---|---|---|
| | II | III | IV | V | VI |
| | Enzyme | | | | |
| | Papain | Papain | Papain | Papain | Papain |
| Coating shortening | 40% ingredient A¹ and 60% ingredient B² | 100% ingredient A¹ | 50% ingredient A¹ and 50% ingredient B² | Same as Ex. IV | Same as Ex. IV |
| Coating shortening characteristics: | | | | | |
| (1) Complete melting point, °F | 120 | 135 | 125 | 125 | 125 |
| (2) I.V. | 60 | 8 | 50 | 50 | 50 |
| (3) SCI at 70° F | 45 | | 50 | 50 | 50 |
| (4) SCI at 105° F | 25 | | 30 | 30 | 30 |
| Emulsifier in coating | None | (³) | (³) | (⁴) | (⁵) |
| Percentage enzyme in agent | 10.7 | 10 | 10 | 10 | 10 |
| Percentage shortening in agent | 89.3 | 80 | 80 | 80 | 80 |
| Percentage emulsifier in agent | None | 10 | 10 | 10 | 10 |
| Weight ratio of shortening to enzyme in agent | 8.3:1 | 8:1 | 8:1 | 8:1 | 8:1 |
| Weight ratio of shortening to emulsifier in agent | | 8:1 | 8:1 | 8:1 | 8:1 |
| Percentage agent in dry mix | 0.84 | 0.84 | 0.42 | 0.42 | 0.42 |
| Northrop units of enzyme activity per gram of flour | 0.7 | 0.7 | 0.35 | 0.35 | 0.35 |
| Sheet strength of dough (grams) | ⁶ 1,150 | ⁶ 1,400 | ⁶ 1,175 | ⁶ 1,375 | ⁶ 1,450 |
| Sheet strength of control dough containing noncoated enzyme shrinkage-reduction agent (estimated) | ⁷ 800 | ⁷ 800 | ⁷ 800 | ⁷ 800 | ⁷ 800 |
| Percentage shrinkage reduction over control containing no shrinkage-reduction agent | 56.6 | 35.4 | 68.5 | 36.8 | 34.8 |

¹ Ingredient A is cottonseed oil hydrogenated to an I.V. of 8.
² Ingredient B is soybean oil hydrogenated to an I.V. of 107 and winterized.
³ "Tween 21".
⁴ 60% "Tween 80", 40% "Tween 85".
⁵ 65% "Tween 60", 35% "Tween 65".
⁶ No tearing during handling.
⁷ Tearing during handling.

The proteolytic enzymes bromelin, ficin, pancreatin, pepsin, rennin, "Rhozyme A-4," "Rhozyme 41" or "Fermex MT" or bacterial proteinases hereinbefore described can be employed in the previous examples in place of their equivalent amount of papain to produce doughs which do not tear during handling even after a conditioning period. Moreover, these doughs are baked to produce crusts in which shrinkage is reduced at least about 25 percent compared to crusts prepared from non-agent-containing doughs. It should be borne in mind that when enzymes are substituted for papain with lower deactivation temperatures than papain possesses, a coating shortening having a lower melting point than those shortenings utilized in the above examples can be necessary.

What is claimed is:

1. A pie crust shrinkage-reducing agent which maintains good dough handling properties before baking, said agent consisting of substantially spherical particles each comprising shortening having embedded regularly therein proteolytic enzyme particles, said spherical particles having diameters ranging from about 150 microns to about 1.5 millimeters, said shortening comprising triglyceride having a complete melting point ranging from about 95° F. to about 155° F. whcih is below the enzyme deactivation temperature, said enzyme being in the form of particles each having its longest dimension ranging from about 5 to about 150 microns, said enzyme particle longest dimension exceeding about 100 microns only when the diameter of the spherical particle in which it is present exceeds about 500 microns, the weight ratio of said shortening to said enzyme ranging from about 20 to 1 to about 1 to 1.

2. A method for producing the agent of claim 1, said method comprising the following steps;

(A) melting triglyceride shortening having a complete melting point ranging from about 95° F. to about 155° F.;
(B) maintaining said shortening in melted condition at a temperature less than the deactivation temperature of the enzyme of step (C) hereinafter;
(C) mixing the shortening in said melted condition with particulate proteolytic enzyme to uniformly distribute said shortening to form a dispersion;
(D) spraying said dispersion to form droplets having diameters ranging from about 150 microns to about 1.5 millimeters;
(E) solidifying said droplets as spheres by cooling them with circulating air having a temperature ranging from about −20° F. to about +40° F.

3. The method of claim 2 wherein the dispersion is sprayed in a generally sharp, flat, angular pattern, said spray pattern being directed at an angle ranging from 0 to about 20 degrees above the horizontal, the angle at the vertex of said angular pattern being at the source of said spray and ranging from about 20 to about 40 degrees, the cooling gas being fed countercurrent to said spray and circulating in spiral fashion therearound, the gas inlet being downstream of the spray at a distance from said vertex ranging from about 5 to about 20 feet, the diameter of said spiral ranging from about 2 to about 10 feet, the ratio of the gas flow rate to the dispersion spray rate ranging from about 0.01 to about 0.5 cubic feet of gas per minute per pound of dispersion per hour.

4. A reduced-shrinkage pie crust dry mix comprising flour, substantially enzyme-free shortening and from about 0.2% to about 1.5% by weight of a pie crust shrinkage reducing agent which maintains good dough handling properties before baking, said agent consisting of substantially spherical particles each comprising shortening having embedded regularly therein proteolytic enzyme particles, said spherical particles having diameters ranging from about 150 microns to about 1.5 millimeters, said shortening comprising triglyceride having a complete melting point ranging from about 95° F. to about 155° F. which is below the enzyme deactivation temperature, said enzyme being in the form of particles each having its longest dimension ranging from about 5 to about 150 microns, said enzyme particle longest dimension exceeding about 100 microns only when the diameter of the spherical particle in which it is present exceeds about 500 microns, the weight ratio of said shortening to said enzyme ranging from 20 to 1 to about 1 to 1, said agent, also being present to about 1.5 Northrop Units of enzyme activity per gram of flour.

5. The dry mix of claim 4 which is comprised of from about 55 to about 75 percent flour and from about 25 to about 45 percent substantially enzyme-free shortening.

6. The dry mix of claim 4 wherein the shrinkage reducing agent is further characterized as follows: Each spherical particle ranges from about 200 microns to about 500 microns; the longest dimension of each enzyme particle ranges from about 10 to about 50 microns; the weight ratio of shortening to enzyme ranges from about 10 to 1 to about 5 to 1; the proteolytic enzyme is papain; the shortening has an SCI value at 70° F. ranging from about 30 to about 100, and SCI value at 105° F. ranging from about 15 to about 60 and an I.V. ranging from about 20 to about 85; the spherical particles comprise additionally an emulsifier selected from the group consisting of polyoxyethylene sorbitan laurates, oleates and stearates containing from about 5 to about 40 oxyethylene groups per molecule; and the weight ratio of shortening to emulsifier ranges from about 20 to 1 to about 5 to 1.

7. A method for preparing baked pie crust, said method comprising the following steps:
(A) adding sufficient work to a wetted mix to form dough characterized by a strongly developed gluten network whereby substantial dough strength is achieved during dough handling, said wetted mix being prepared by adding water to the dry mix of claim 4, the amount of added water ranging from about 10% to about 25% by weight of wetted mix;
(B) baking a pie crust shell formed from the dough of step (A) whereby the shortening enrobing the enzyme in the shrinkage-reducing agent is melted at a temperature below both the gluten coagulation and enzyme deactivation temperatures, exposing active enzyme to said gluten network to partially destroy said network whereby shrinkage in the baked crust is reduced at least about 25 percent.

8. The method of claim 7 wherein the dough prepared in step (A) is conditioned at room temperature before baking, for a period of time ranging from about one-half to about two hours.

References Cited

UNITED STATES PATENTS

| | | | |
|---|---|---|---|
| 2,506,358 | 5/1950 | Harrel et al. | 99—94 |
| 2,686,721 | 8/1954 | Callaghan et al. | 99—94 |

FOREIGN PATENTS

| | | | |
|---|---|---|---|
| 465,111 | 4/1937 | Great Britain | 99—118 |

OTHER REFERENCES

Bryce, W. W., Food Manufacture, vol. 41, No. 1, January 1966, pages 18–20.

RAYMOND N. JONES, Primary Examiner

U.S Cl. X.R.

99—92

PO-1050
(5/69)

UNITED STATES PATENT OFFICE
CERTIFICATE OF CORRECTION

Patent No. 3,561,975      Dated February 9, 1971

Inventor(s) James E. Luebering and Eddy R. Hair

It is certified that error appears in the above-identified patent and that said Letters Patent are hereby corrected as shown below:

Column 1, line 12      "protase" should be -- protease --.

Column 6, line 15      "sohrtening" should be -- shortening

Column 6, line 29      "aditional" should be -- additional -- and a comma should be inserted after "mixing".

Column 10, between lines 5 and 6 the following should be inserted:

-- shrinkage in dough containing the agents herein with the --.

Column 13, between lines 48 and 49 the following should be ins

-- in an amount sufficient to provide from about 0.1 --.

Signed and sealed this 26th day of October 1971.

(SEAL)
Attest:

EDWARD M. FLETCHER, JR.      ROBERT GOTTSCHALK
Attesting Officer      Acting Commissioner of Patents